Patented Sept. 15, 1936

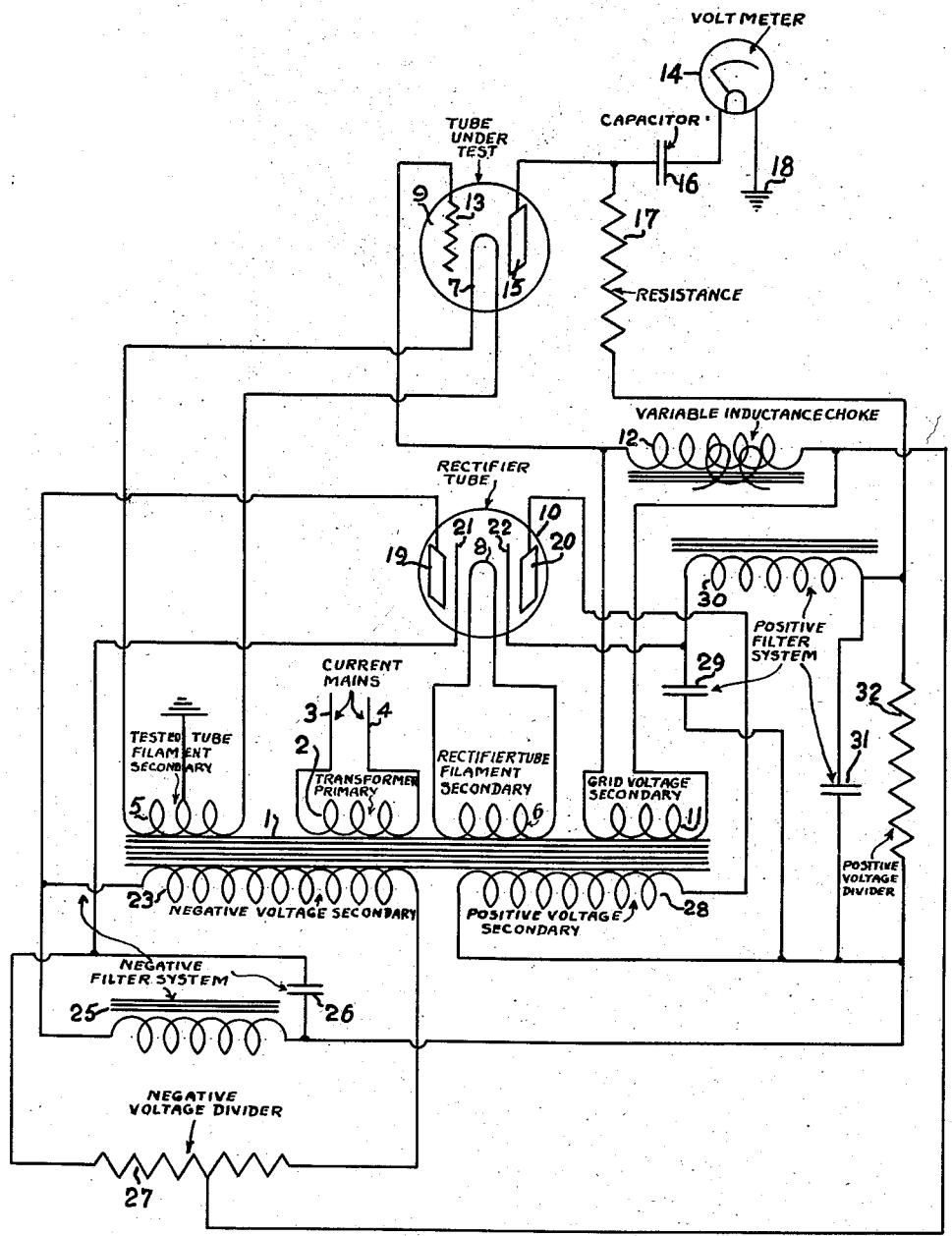

2,054,611

UNITED STATES PATENT OFFICE 2,054,611

TUBE TESTER

Floyd E. Wenger, Bluffton, Ohio, assignor to Ray L. Triplett, Bluffton, Ohio

Application July 16, 1934, Serial No. 735,387

10 Claims. (Cl. 250—27)

This invention relates to electrical testing apparatus and particularly to apparatus for testing the characteristics of electronic tubes for radio and similar purposes.

One object of my invention is to provide a tube tester which will measure the output gain of an electronic tube as determined by its amplification value.

Another object is to provide a tube tester for measuring the amplification factor of electronic tubes, and which is adapted to employ the same potentials such as are supplied in practice to the circuits wherein these tubes are used.

Another object is to provide a tube tester wherein the same dynamic curve characteristics of the tube elements will be measured as resulting from applying the same potentials as are used in the actual practice with such tubes.

Another object is to provide a tube tester which permits the use of the so-called "English Reading Scale", that is, a scale which indicates merely "good" and "poor" tube values as regards the amplification factor thereof.

Another object is to provide a tube tester for measuring the amplification factor of electronic tubes wherein the predetermined and proper alternating current voltage for the particular tube under test is applied to the grid thereof, and the amplification factor measured on a voltmeter, the value thus obtained for the tube corresponding to the tube output measured in pulsating or alternating current volts.

Another object is to provide a tube tester for measuring the amplification factor of electronic tubes under conditions similar to operating conditions, and employing a double cathode rectifying tube for simultaneously producing a positive direct current plate voltage and a negative direct current grid bias for the tested tube, whereby the grid bias applied to the grid of the tube always remains constant regardless of the current draw of the other tube elements, the amplification factor being determined by measuring the alternating current output voltage from the plate of the tested tube corresponding to the alternating current input voltage which has been applied to the grid thereof.

In the drawing:

The figure shows a wiring diagram containing the various elements used in an illustrative form of my invention.

Referring to the wiring diagram of the figure in detail, the tube tester of this embodiment of my invention consists of a transformer, generally designated 1, and having multiple secondaries.

The transformer 1 is provided with a primary winding 2 which is connected to the external current mains through the power lines 3 and 4 respectively.

The transformer 1 contains two secondary windings 5 and 6 which are used respectively to supply filament voltage for the filaments 7 and 8 of the tube 9 under test and the rectifier tube 10. In practice the secondary winding 5 would preferably be tapped in order to provide the various filament voltages required for the different kinds of electronic tubes which would ordinarily be tested. It will also appear later that a pair of rectifier tubes 10 may be used instead of the single rectifier tube shown, in which case the secondary winding 6 would supply a filament voltage suitable for both filaments 8 of these tubes.

The transformer 1 is also provided with a tapped secondary winding 11, together with a variable inductance choke 12. The latter is employed for varying the alternating current signal voltage which is applied to the grid 13 of the tested tube 9. Alternately a tapped secondary winding 11 or a tapped inductance in the place of the variable inductance choke 12 and controlled by a selector switch, may be used to control the alternating current signal voltage impressed upon the grid 13 of the tested tube 9. After this predetermined alternating current voltage is applied to the grid of the tube 9, the amplification factor thereof is measured on the voltmeter 14 connected to the plate 15 of the tube 9. In order to prevent the flow of direct current to the voltmeter 14, some means which will pass only alternating current is employed, the means shown being a capacitor 16 and a resistance 17 connected to the line joining the plate 15 of the tube 9 to the voltmeter 14. The opposite terminal of the latter is grounded as at 18. The connections of the voltmeter 14 to the plate 15 of the tube 9 in this manner also provide the proper impedance matching between the tested tube 9 and the voltmeter 14.

In order to furnish the proper positive voltage which may be required for energizing the various tube elements, I preferably employ the single rectifier tube 10. This tube 10 is of the type designated commercially as No. 25Z5 and contains a pair of plates 19 and 20 and a pair of cathodes 21 and 22 in addition to the filament 8 previously mentioned. The second cathode 21 and the plate 19 of the rectifier tube 10 furnish the negative voltages or bias as may be required to energize any element of the tested tube 9. Thus the grid bias voltage of the tube tester may be kept constant irrespective of the amount of current drawn by the other tube elements. The amplification factor is accordingly found for predetermined and prescribed voltages.

The transformer 1 is provided with a secondary winding 23 for supplying the necessary negative voltages mentioned above. The circuit connected to this negative secondary winding 23 also contains the filters 25 and 26 for the negative voltage circuit described. The polarity of this winding 23 is determined according to the circuit connections. The negative voltage divider 27 in this same circuit provides the means for impressing the proper negative voltages to the tube 9 under test.

In a similar manner, the transformer 1 also contains a positive secondary winding 28 which supplies the necessary positive voltages for the various tubes 9 which may be tested. The positive voltage circuit containing the positive voltage secondary winding 28 also contains the positive filters 29, 30 and 31, as well as the positive voltage divider 32 for providing the positive voltage desired. The polarity of the positive voltage secondary winding 28 is also determined according to the circut connections.

In the operation of the tube tester of my invention, the tube 9 to be tested is inserted in the circuit and the proper filament voltage impressed upon its filament 7 by adjusting the filament voltage secondary winding 5 of the transformer 1. At the same time, the proper "B" battery voltage is applied to the plate 15 thereof, through the connections shown. The prescribed alternating current signal voltage is then impressed upon the grid 13 of the tested tube, either by adjusting the variable inductance choke 12 or the previously mentioned inductance or tapped secondary windings which may be substituted for it. The alternating current signal voltage thus impressed upon the input circuit of the tube then causes a change in the plate current flowing through the inductance or resistance in the external plate circuit shown, the alternating current voltage corresponding to the tube output being then indicated upon the voltmeter 14. The amplification factor of the tube is independent of the magnitude of the input voltage over that part of the tube characteristic curve which has a uniform slope—that is, where the amplification is distortionless. The latter is, of course, the only useful portion of the curve as far as the audible reproduction of vocal or musical sounds is concerned, although not critical where mere signal sounds are amplified. The tube characteristic curve referred to is, of course, the graph showing the relationship between the plate current and the grid potential, as is well known to those skilled in the electronic tube art.

Thus the tube tester of my invention measures the amplification factor of a tube at predetermined and prescribed alternating current signal voltages impressed on the grid 13 thereof. The conditions under which the tube is tested are, therefore, substantially identical with those under which the tube is used in practice, hence a faithful and accurate representation of the amplification factor of any tube is quickly and easily measured.

The scale of the voltmeter 14 may be calibrated in any desired manner, but it will be found simple and convenient to employ the so-called "English Reading Scale". The latter scale merely indicates, as by differently colored sections, whether the tube is "good" or "poor" as regards its amplification factor.

It will be understood that the rectifier tube 10 may be replaced by a pair of rectifier tubes having plates and single cathodes. The single rectifier tube 10 with the multiple elements is, however, found more convenient for the reasons previously stated.

The method of measuring the amplification factors of tubes comprising the method branch of my invention has been disclosed in the description of the operation of my tube tester, but is equally applicable to other arrangements and circuits. In brief my method of testing tubes comprises applying a prescribed filament voltage to light the filament of the tube, impressing a prescribed plate voltage upon the plate of the tube, impressing a predetermined alternating current signal voltage upon the grid of the tube, and measuring the alternating current output upon a voltmeter connected to the external plate circuit of the tube.

It will be understood that I desire to comprehend within my invention such modifications as may be necessary to adapt it to varying conditions and uses.

Having thus fully described my invention, what I claim as new and desire to secure by Letters Patent is:

1. A tube tester for measuring the amplification factors of electronic tubes comprising means for supplying from an alternating current source positive and negative direct current potentials for the plate energization and grid bias respectively of said tested tube, said means comprising a separate rectifying means for each current potential whereby the grid bias supplied to the grid of the tube being tested remains constant regardless of the amount of current draw of the tube elements and means for measuring the amplification factor of said tube being tested.

2. A tube tester for measuring the amplification factors of electronic tubes comprising means for supplying from an alternating current source positive and negative direct current potentials for the plate energization and grid bias respectively of said tested tube, said means comprising a separate rectifying means for the negative grid bias whereby the grid bias supplied to the grid of the tube being tested remains constant regardless of the amount of current draw of the tube elements and means for measuring the amplification factor of said tube being tested.

3. A tube tester for measuring the amplification factors of electronic tubes comprising means for supplying from an alternating current source positive and negative direct current potentials for energization of the electrodes of said tube, said means comprising a separate rectifying means for the negative grid bias whereby the grid bias supplied to the grid of the tube being tested remains constant regardless of the amount of current draw of the tube elements and means for measuring the amplification factor of said tube being tested.

4. A tube tester for measuring the amplification factors of electronic tubes comprising means for supplying from an alternating current source positive and negative direct current potentials for the plate energization and grid bias respectively of said tested tube, said means comprising a separate rectifying means for each current potential including double plate and double rectifying elements whereby the grid bias supplied to the grid of the tube being tested remains constant regardless of the amount of current draw of the tube elements and means for measuring the amplification factor of said tube being tested.

5. A tube tester for measuring the amplification factors of electronic tubes comprising means for supplying from an alternating current source positive and negative direct current potentials for the plate energization and grid bias respectively of said tested tube, said means comprising a separate rectifying means for each current potential including double plate and double rectifying elements, one plate and one cathode supplying the direct current potential, whereby the grid bias supplied to the grid of the tube being tested remains constant regardless of the amount of current draw of the tube elements, and means for measuring the amplification factor of said tube being tested.

6. A tube tester for measuring the amplification factors of electronic tubes comprising means for supplying from an alternating current source positive and negative direct current potentials for the plate energization and grid bias respectively of said tested tube, said means comprising a separate rectifying means for the negative grid bias whereby the grid bias supplied to the grid of the tube being tested remains constant regardless of the amount of current draw of the tube elements, and means for measuring the amplification factor of said tube being tested and a variable inductance connected to said source of alternating current potential for varying the alternating current signal voltage.

7. A tube tester for measuring the amplification factors of electronic tubes comprising means for supplying from an alternating current source positive and negative direct current potentials for energization of the electrodes of said tube, said means comprising a separate rectifying means for the negative grid bias whereby the grid bias supplied to the grid of the tube being tested remains constant regardless of the amount of current draw of the tube elements and means for measuring the amplification factor of said tube being tested, and a variable inductance connected to said source of alternating current potentials for varying the alternating current signal voltage.

8. A tube tester for measuring the amplification factors of electronic tubes comprising means for supplying from an alternating current source positive and negative direct current potentials for the plate energization and grid bias respectively of said tested tube, said means comprising a separate rectifying means for the negative grid bias whereby the grid bias supplied to the grid of the tube being tested remains constant regardless of the amount of current draw of the tube elements and means for measuring the amplification factor of said tube being tested, an alternating current supply connected to said grid being tested, and a variable inductance controlling said voltage of said grid.

9. A tube tester for measuring the amplification factors of electronic tubes comprising means for supplying from an alternating current source positive and negative direct current potential for energization of the electrodes of said tube, said means comprising a separate rectifying means for the negative grid bias whereby the grid bias supplied to the grid of the tube being tested remains constant regardless of the amount of current draw of the tube elements and means for measuring the amplification factor of said tube being tested, an alternating current supply connected to said grid being tested, and a variable inductance controlling said voltage on said grid.

10. A tube tester for measuring the amplification factors of electronic tubes comprising means for supplying from an alternating current source positive and negative direct current potentials for the plate energization and grid bias respectively of said tested tube, said means comprising a separate rectifying means for each current potential including double plate and double rectifying elements, whereby the grid bias supplied to the grid of the tube being tested remains constant regardless of the amount of current draw of the tube elements and means for measuring the amplification factor of said tube being tested, an alternating current supply connected to said grid being tested, and a variable inductance controlling said voltage on said grid.

FLOYD E. WENGER.